April 24, 1956  W. A. ROTH  2,742,989
RETRACTABLE VALVE CLUTCH
Filed Feb. 25, 1953  3 Sheets-Sheet 1

INVENTOR
William A. Roth
BY Robert M. Dunning
ATTORNEY

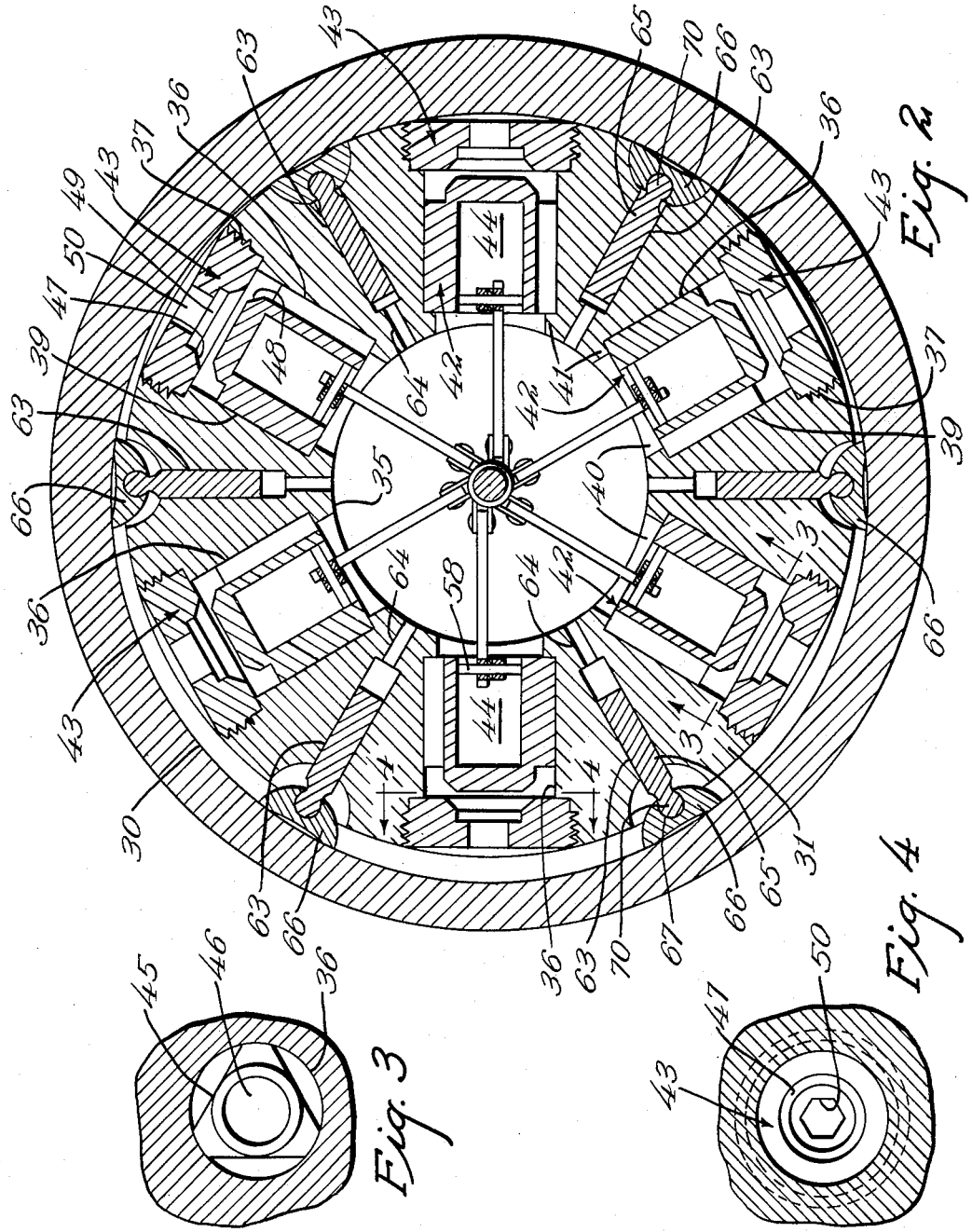

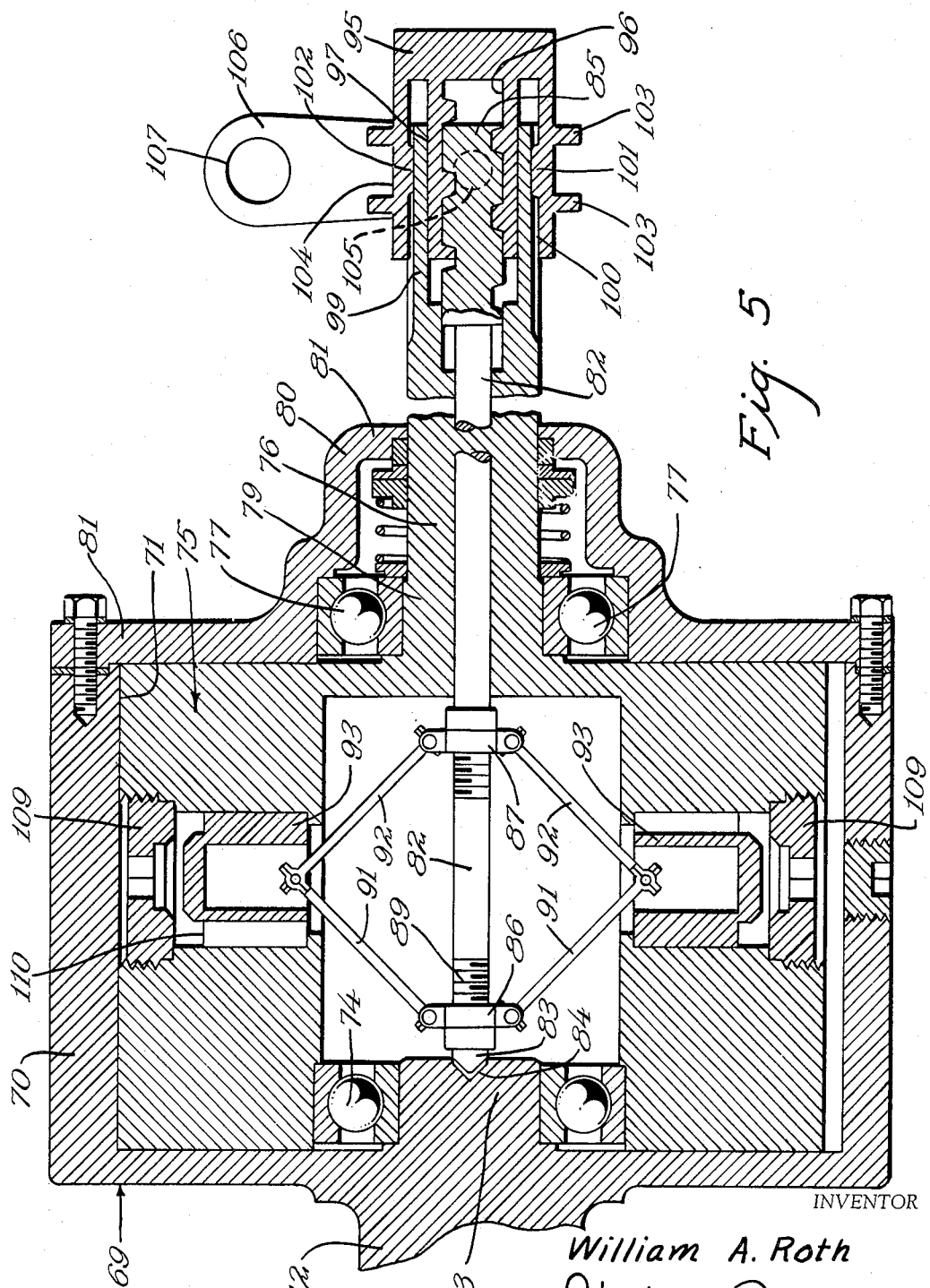

United States Patent Office 2,742,989
Patented Apr. 24, 1956

2,742,989

RETRACTABLE VALVE CLUTCH

William A. Roth, St. Paul, Minn., assignor of twelve and one-half per cent to Joseph J. Palkowitch, St. Paul, twelve and one-half per cent to Paul Vance, South St. Paul, twelve and one-half per cent to Louis R. Unger, South St. Paul, and seventeen and one-half per cent to Arthur J. Alberts, St. Paul, Minn.

Application February 25, 1953, Serial No. 338,644

12 Claims. (Cl. 192—58)

My invention relates to an improvement in hydraulic clutches wherein it is desired to provide a simple and effective means for connecting a drive shaft and a driven shaft to provide automatic control of torque.

It is a primary object of the present invention to provide a device having features similar to a rotary pump in combination with other elements including a governing device to provide automatic control of torque from zero to a maximum. This device may be used to connect any rotary drive member to a rotary driven member and is reversible in operation.

A feature of my invention lies in providing a hydraulic clutch which will circulate the hydraulic fluid only for relatively short periods of time during operation. During normal use the fluid in the clutch is held from circulation so that the driven element rotates at the same speed as the driving element. However, when the speed of the driven element is not the same as the speed of the driving element, circulation of fluid within the clutch takes place for the required period of time until the speed of the drive and driven elements is equalized. As soon as maximum torque is no longer required or when the speed of the drive and driven elements is equalized, the further circulation of fluid is again automatically prevented.

A further feature of the present invention lies in the provision of a hydraulic clutch that is designed for a great variety of uses, but which is particularly adapted for use as a drive for automobiles, trucks, tractors, locomotives, and other vehicles, or as a flexible coupling.

An added feature of the present invention lies in the fact that my hydraulic clutch may be easily and inexpensively installed in a vehicle previously manufactured so as to convert the vehicle drive into fluid drive.

The structure of my present invention is an improvement upon my previous Patent No. 2,571,063.

An added feature of the present invention lies in the provision of a hydraulic clutch having a series of angularly disposed radially extending piston valves which are urged apart by centrifugal force and which are connected together so that they must function in unison. Accordingly in order for the valves to close it is necessary for the centrifugal force plus the suction effect acting outwardly on certain of the pistons to overcome the force of fluid directed inwardly against the piston ends tending to urge the pistons inwardly.

These and other objects and novel features of my invention will be more clearly and fully set forth in the following specification and claims.

In the drawings forming a part of my specification:

Figure 2 is a cross-sectional view taken on a plane at right angles to the section of Figure 1 along a plane indicated by the line 2—2 of Figure 1.

Figure 3 is a sectional view through one of the pistons within which the piston valve operates showing the construction thereof taken on section line 3—3 of Figure 2.

Figure 4 is a sectional view through a detail portion of the apparatus showing an end view of one of the valve sets taken on section line 4—4 of Figure 2.

Figure 5 is a sectional view through a modified form of construction.

Figure 1:
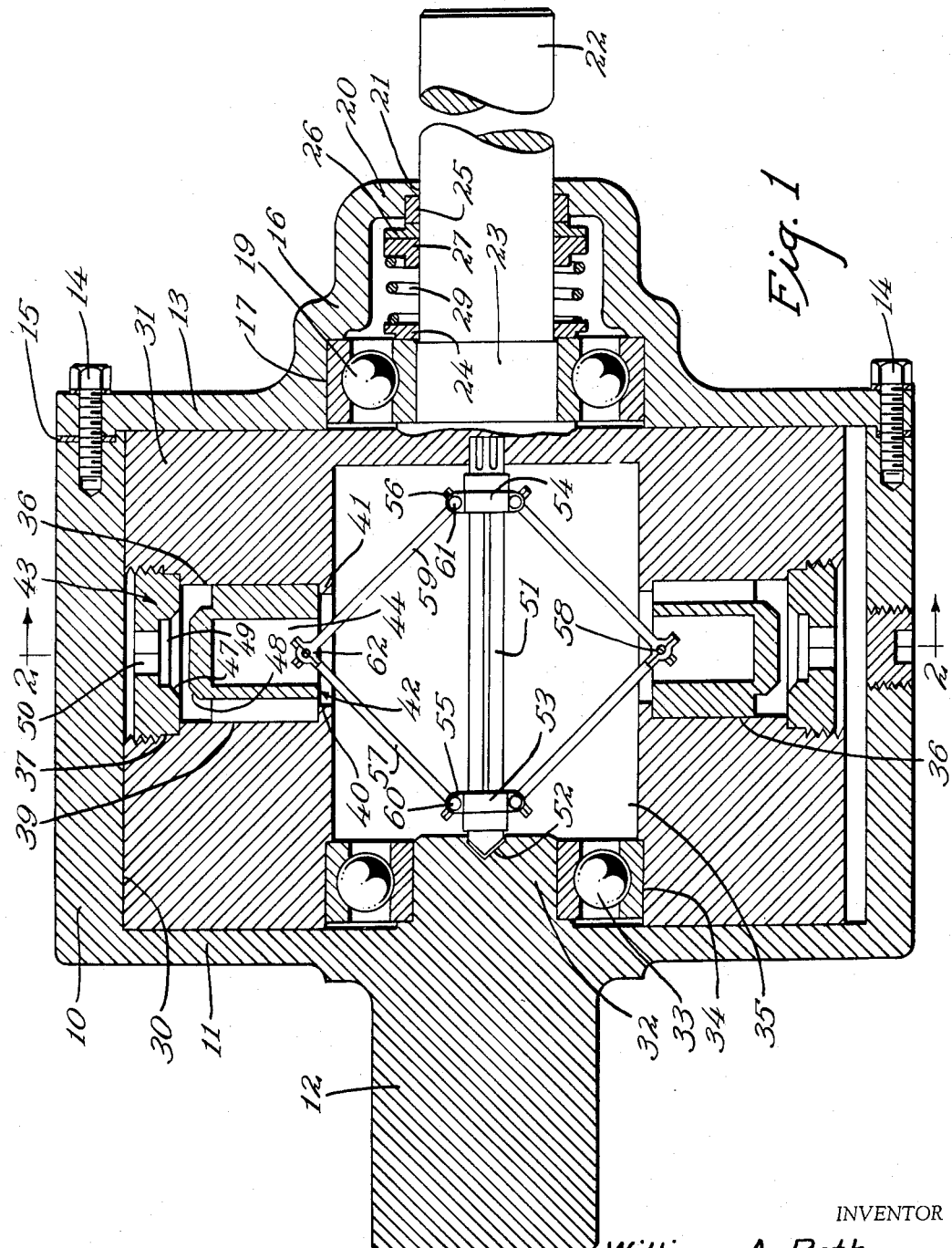
Figure 1 is a sectional view through my clutch showing the general relationship of parts therein.

The clutch is enclosed within a casing designed to rotate with a portion of the apparatus. The valve housing includes an outer shell 10 having a generally cylindrical outer surface and an end closure disc 11 connected to one end thereof. A stub shaft 12 is connected to, and extends axially from, the closure plate 11 and is concentric with the outer surface of the outer casing.

A closure plate 13 of disc like form is connected to the open end of the shell 10 by cap screws 14 or other suitable means. A sealing gasket 15 is preferably interposed between the two casing parts in order to seal the same. A projecting hub 16 is provided upon the closure plate 13. This hub is internally bored as indicated at 17 to accommodate a ball bearing 19. The hub 16 extends beyond the bearing 19 and terminates in an inwardly extending flange 20 which has an axial opening 21 snugly encircling the drive shaft 22. The drive shaft 22 is provided with an enlarged diameter portion 23 which accommodates the inner race of the bearing 19.

A sealing means is interposed between the bearing 19 and the flange 20. A sealing ring 24 fits against the inner race of the bearing 19 and forms a seal therewith. A bearing ring 25 encircles the shaft 22 and is recessed into the flange 20 to abut thereagainst. A wearing ring 26 which is L-shaped in section abuts against the bearing ring 25 and an opposed L-shaped ring 27 abuts against the surface of the ring 26. A spring 29 is interposed between the rings 24 and 27 so as to form an effective seal.

The shell 10 is provided with an inner bore or inner surface 30 which is eccentric with respect to the axis of the shaft 22. A rotor 31 is integral with or connected to the inner end of the drive shaft 22. This rotor 31 is of cylindrical form and is of proper diameter to extend in closely spaced relation to a portion of the periphery of the surface 30 at one point on the circumference of the rotor.

A stub shaft or boss 32 extends inwardly from the closure wall 11 and acts to support the inner race of a ball bearing 33. The outer race of the bearing fits into a bore 34 within the end of the rotor 31. The rotor 31 is provided with a hollow interior 35 which forms a chamber for hydraulic fluid as will be later described in detail.

A series of radially extending cylinders 36 are provided in the rotor 31, these cylinders being arranged with their axes in a plane normal to the axis of the rotor. Each cylinder includes a relatively large diameter outer portion 37, a cylindrical intermediate diameter portion 39 and a cylindrical smaller diameter portion 40 at the inner extremity of the cylinder. The shoulder 41 between the smallest diameter portion 40 and the intermediate diameter portion 39 acts as an abutment for limiting the inward movement of the piston valves which are indicated in general by the numeral 42.

The largest diameter portion 37 of each cylinder is internally threaded to accommodate the valve seat plug 43. Each of the pistons includes a hollow interior 44 and externally and generally triangular in shape as illustrated in Figure 3. In other words, angularly arranged chords 45 are cut from three sides of the valve body so that the remaining portions of the valve fit with a running fit within the cylinders 36 but the chords provide notches or apertures so that hydraulic fluid can flow past the body of each valve. Each valve is also provided with a projecting plug 48 having a tapered extremity to fit against a corresponding seat.

The valve seats 43 comprise a generally cylindrical ring which is externally threaded for accommodation into the internally threaded cylinder portion 37. Each valve includes a tapered seat 47 which is connected by a cylindrical passage portion 49 to a square or hexagonal passage 50. The passage 50 is purposely made multi-sided to permit access of a wrench or similar tool for tightening a plug in place. The tapered portion 47 of the valve seat is designed to snugly fit against the cooperable projection 48 of the valve 42 to form a seal thereagainst. Light springs may be inserted inwardly of the valves to assist the action of centrifugal force at low rotative speeds if desired.

The drive shaft 22 is provided with an elongated relatively small diameter extension 51 which extends through the chamber within the rotor. The end of the projecting shaft 51 is supported by a bearing 52 in the stub shaft 32. While in the construction illustrated the central shaft 51 is shown having a conical end which fits in a similar conical bearing, this specific arrangement need not be employed.

A pair of collars 53 and 54 are slidably but non-rotatably supported upon the shaft 51. Each collar is provided with a series of angularly related lugs 55 and 56 respectively between which the connecting rods 57 and 59 are pivoted. Pivots 60 and 61 extend through the lugs 55 and 56 and through a corresponding end of each connecting rod to connect the rods to the collars. The connecting rods 57 and 59 are pivotally connected at 62 to a wrist pin 58 extending from side to side of each piston valve 42. Thus each of the pistons 42 is connected to two collars 53 and 54 and these collars are connected by similar piston rods to all of the other valves. Thus if one valve 42 moves outwardly all of the other valves must also move outwardly and movement from one valve is transmitted to all of the others.

As indicated in Figure 2 of the drawings, a series of radially extending grooves 63 are provided in the rotor 31, these grooves being alternately arranged with the cylinders 36. The grooves 63 are rectangular in section and are connected to the interior of the bore 35 by spaced apertures 64. A rectangularly shaped vane 65 is slidably supported in each of the grooves 63 for sliding movement inwardly and outwardly. A shoe 66 is provided with a transverse cylindrical socket 67 designed to accommodate the transverse cylindrical extension 70 of the vanes 65. As a result the shoe 66 can pivot within reasonable limits upon the end of the vane to which it is attached. The shoe 66 is designed to slide over the eccentric inner surface 30 of the pump housing.

In the operation of the apparatus the shaft 22 is connected to an automobile engine or to any other source of power supply. Rotation of the shaft 22 causes rotation of the rotor 31. The casing 10 which is connected to the stub shaft 12 resists rotation. As the rotor 31 rotates at a relatively low rate of speed, hydraulic fluid is forced through the valve plugs 43 and past the valves 42 forwardly of the shoes 99 as these shoes slide about the eccentric inner surface 30 of the housing. At low rates of speed the centrifugal force upon the valves is insufficient to cause these valves to be urged outwardly against the valve seats. As the shoes pass the largest center of the cycle and tend to be forced in by engagement with the wall 30, fluid forwardly of the shoes is forced through the plugs and past the valves. Similarly as the shoes travel outwardly due to an increasing distance between the circumference of the rotor and the surface of the housing, a suction effect is created rearwardly of the shoes tending to deliver fluid outwardly from the center compartment past the valves 42 and through the plugs 43.

In the present device, there are forces tending to move the piston valves outwardly, and opposed forces tending to force the piston valves inwardly. Centrifugal force acts to urge the valves outwardly, and this is supplemented by a suction effect on the valves located in chambers which are expanding in size. The force tending to urge the valves open, or inwardly, is the pressure created by the contraction of the chambers. The liquid forwardly of each vane must be expelled from the contracting chambers; and the only outlet (other than leakage) is past the piston valves. Thus, the liquid in the contracting chambers between successive vanes may exert a tremendous force against the valve ends tending to hold them open.

As the valves must move in unison, the inward force against certain of the valves holds all of the valves open, particularly at low speeds and when the driving engine is accelerating. Under these conditions, centrifugal force, and suction force, is substantially less than the force of the liquid forwardly of the vanes in the contracting pockets. At low speeds, centrifugal force is small, and easily counteracted. Even at high speeds, when the engine is accelerated torque is exerted upon the rotor tending to rotate the same faster than the casing can turn. As a result, sufficient pressure is exerted upon the hydraulic fluid forwardly of the vanes in the contracting chambers to force the valve inwardly until the speed of the casing equals that of the rotor.

As the speed of rotation of the rotor increases there is a greater outward force upon the valve tending to resist inward movement thereof. Thus centrifugal force assists the suction effect on certain of the pistons tending to draw them outwardly while the inward force upon the valves does not substantially change. Accordingly as the speed of the rotation increases the centrifugal force acting upon the valve pistons combined with the suction effect on certain of the valves tends to close all of the valves.

When all of the valves are closed, fluid can not flow inwardly through the plugs 43 and past the valve plungers 42 and accordingly fluid forwardly of the shoes can not escape. In such an instance the casing rotates at the same speed as the driven member.

It will be noted that the action in all of the piston valves is equalized by connecting the same through the linkage mechanism described. Therefore, certain of the valves which would be normally readily closed by the suction effect aided by centrifugal force are, at low speeds, held from seating by the inward force upon others of the pistons.

In Figure 5 of the drawings I disclose a modified form of construction which is quite similar to the construction previously described, but which includes a means whereby the apparatus can be manually controlled. In this construction the housing 69 is almost identical to that previously described. The housing 69 includes an outer sleeve 70 which is provided with an eccentric inner surface 71. A driven shaft 72 projects from the housing and a stub shaft 73 extends axially inwardly therefrom. A bearing 74 supports the rotor 75 which is connected to a stub shaft 76 axially aligned with the inwardly projecting stub shaft 73. A bearing 77 encircles a relatively large diameter portion 79 of the stub shaft 76 and the outer race of the bearing 77 is supported within the hub portion 80 connected to the housing closure plate 81. A seal similar to that previously described may be interposed between the ball bearing 77 and the end flange 81 of the housing.

A shaft 82 is supported axially of the housing and is shown as having a tapered end 83 which fits into a suitable bearing 84 in the stub shaft 73. The shaft 82 extends through the stub shaft 76 and is provided with an enlarged threaded end 85.

A pair of collars 86 and 87 encircle the shaft 82 and are internally threaded. The shaft 82 is provided with a threaded portion 89, half of which is provided with right hand threads and the other half of which is provided with left hand threads. Thus as the shaft 82 rotates in one direction relative to the collars 86 and 87, these collars move inwardly together. As the collars 86 and 87 rotate in the opposite direction relative to the shaft 82, the collars are urged apart.

Connecting rods 91 and 92 connect the collars 86 and 87 to each of the valve pistons 93. As a result the movement of the piston valves 93 is regulated by rotating the shaft 82 relative to the collars 86 and 87. If the links 91 and 92 are in the position illustrated in Figure 5, the piston valves 93 are at their innermost position. However, by rotating the rod 82 relative to the collars 86 and 87, the valve pistons 93 may be moved inwardly or outwardly. Rotation of the collars in one direction causes outward movement of the valves 93 while relative rotation of the shaft 82 in the opposite direction causes inward movement of the valves 93.

A cap 95 is provided with an inner sleeve 96 which is internally threaded to accommodate the external threads 85 of the shaft 82. Thus if the cap 95 is held from rotation, axial movement thereof longitudinally of the shaft 82 will tend to rotate the shaft 82 in one direction. Longitudinal movement of the cap 95 in the opposite direction tends to move the piston valves 93 inwardly.

The stub shaft 76 is provided with an axial socket 97 in its end for accommodation of a sleeve 99 which forms a part of the stub shaft 76. The sleeve 99 is externally splined as indicated at 100 and the splined portion is for the most part concealed by the outer sleeve 101 of the cap 95. Inwardly extending teeth or projections 102 are provided on the outer sleeve 101 engageable in the splines 100 of the sleeve 99. A pair of peripheral flanges 103 encircle the outer sleeve 101 in spaced relation to provide a clutch groove 104 therebetween. These clutch teeth are designed to accommodate the clutch roller 105 of an operating arm 106 pivoted at 107. The arm 106 may be pivoted by any suitable means.

As the arm 106 is swung or oscillated about its pivot 107 the outer sleeve 101, together with the inner sleeve 96 is moved toward the main body of the housing. Inward movement of the sleeve 97 causes rotation of the threaded portion 85 of the shaft 82. Such movement causes the collars 86 and 87 to move toward one another to urge the valves 93 outwardly against their seats which are in the plugs 109. If the arm 106 is moved sufficiently the valves 110 will be completely closed against their seats, thereby preventing escape of hydraulic fluid and closing these valves. As a result the casing will rotate in unison with the drive shaft.

If the arm 106 is rotated in a reverse direction, the shaft 82 is rotated, causing the collars 86 and 87 to move apart and to thereby draw the plunger valves 93 inwardly. Thus the device shown in Figure 5 functions automatically and may be automatically set to a predetermined condition.

As the operation of the structure shown in Figure 5 is identical with that previously described, with the exception of the operating arm 106 and its cap 95 which it engages, no detail description of the operation will be given. It will be seen that when the valves are moved against their seats, the casing will move in unison with the rotor. However, when the links 91 and 92 are in any other position the piston valves can not move against their seats and the rotor will force fluid through openings forwardly of the shoes and will draw fluid past the valves from openings rearwardly of the shoes.

In accordance with the patent statutes, I have described the principles of construction and operation of my hydraulic and manual clutch, and while I have endeavored to set forth the best embodiment thereof, I desire to have it understood that obvious changes may be made within the scope of the following claims without departing from the spirit of my invention.

I claim:

1. A hydraulic clutch including a casing member, a rotor supported within said casing and eccentric thereto, a plurality of radially extending cylinders in said rotor, a vane slidably supported for sliding movement in a radial direction between said cylinders, an apertured valve seat at the outer end of each of said cylinders, a piston valve slidably supported in each of said cylinders for movement toward and away from said valve seats, and means connecting said piston valves for inward and outward movement in unison.

2. The structure described in claim 1 and in which said last named connecting means includes a connecting rod connected to each of said piston valves, a shaft axially supported within said rotor, and means slidable on said shaft and connected to said connecting rods.

3. A hydraulic clutch unit including a housing, a rotor rotatably supported within said housing, said housing having an inner surface which extends closely adjacent to said rotor at at least one point and which is spaced substantially from said rotor at at least one other point, said rotor including a plurality of vanes slidably supported thereupon for radial movement, said vanes being arranged to follow the inner surface of said housing, said rotor having a hollow chamber interiorly thereof, a series of bores extending radially from said interior chamber to the periphery of the rotor, a valve seat in each of said bores having aperture means therethrough, a piston valve supported in each of said bores and slidable radially toward and away from said valve seat, and means connecting said pistons to cause movement thereof in unison, outward movement of one of said piston valves causing corresponding outward movement of the other piston valves.

4. The construction described in claim 3 and including a plug extending into each said bore at the outer end thereof, in which said valve seat is located.

5. The structure described in claim 3 and including a ring shaped plug inserted into each of said bores and on which said valve seat is provided.

6. The structure described in claim 3 and in which the means connecting the pistons for movement in unison includes a connecting rod connected to each piston valve, and a slidable member slidable axially of said rotor to which each connecting rod is connected, axial movement of said slidable member causing relative radial movement of said piston valves in unison.

7. The structures described in claim 3 and including a pair of slidable members slidable axially of said rotor within said chamber in said rotor, and connecting rods connecting each of said axially slidable members to each of said pistons, whereby movement of said axially slidable members toward one another causes relative radial outward movement of said piston valves.

8. The structure described in claim 3 and including an axial shaft within said rotor, a movable member adjustably supported upon said shaft for axial movement thereon, and connecting rod means connecting each said piston valve to said axially movable member, said connecting rods and axially movable member forming said means for causing relative radial movement of said piston valves in unison.

9. The structure described in claim 3 and including means for manually controlling the movement of said piston valves.

10. The structure described in claim 3 and including means externally of said housing for manually controlling the movement of said piston valves during rotation of said rotor.

11. A hydraulic clutch including a housing, a rotor supported within said housing, said housing having an inner surface spaced from the peripheral surface of said rotor, a variable distance to provide at least one cavity between said rotor and said housing, a plurality of vanes supported by said rotor for radial movement and designed to follow the inner surface of said housing, a bore interposed between each adjacent pair of vanes, a chamber within said rotor, said bores connecting said chamber with the outer surface of a said rotor, a valve seat positioned in each of said bores, a piston valve slidably supported in each of said bores and slidable toward and away from said seat, connecting rod means connected to each of said piston valves, adjustable means in said chamber movable axially of said rotor and to which each of said connecting rod means are connected, radial movement of said piston valves being relatively controlled by the axial movement of said adjustable means, and means outwardly of said housing for controlling the position of said adjustable means.

12. The structure described in claim 11 and including a threaded element within said chamber, said adjustable means being mounted upon said threaded element, rotation of said threaded element relative to said adjustable means causing axial movement thereof.

References Cited in the file of this patent

UNITED STATES PATENTS

| | | |
|---|---|---|
| 2,115,244 | Savage | Apr. 26, 1938 |
| 2,116,049 | Staats | May 3, 1938 |
| 2,571,063 | Roth | Oct. 9, 1951 |